United States Patent

Walker

[15] 3,655,289

[45] Apr. 11, 1972

[54] OPACITY METER WITH NOISE SUPPRESSION

[72] Inventor: Jimmy Aubrey Walker, Fountain Valley, Calif.

[73] Assignee: The Susquehanna Corporation, Fairfax, Va.

[22] Filed: Jan. 22, 1971

[21] Appl. No.: 108,821

[52] U.S. Cl.............................356/201, 250/206, 250/218, 307/231, 307/264, 325/323, 328/162, 356/207
[51] Int. Cl...............G01n 21/06, G01n 21/22, G01n 21/12
[58] Field of Search.................356/201, 204, 205, 207, 208; 324/102; 307/231, 264; 250/206, 218; 325/323, 473

[56] References Cited

UNITED STATES PATENTS

| | | | |
|---|---|---|---|
| 3,419,333 | 12/1968 | Towner.................................356/205 |
| 3,428,814 | 2/1969 | Doonan............................356/205 X |
| 3,441,349 | 4/1969 | Daley et al.........................356/205 X |
| 3,548,206 | 12/1970 | Ogle et al...........................307/231 X |
| 3,560,098 | 2/1971 | Witte et al. ............................356/205 |
| 3,537,306 | 11/1970 | Bedinger............................356/205 X |
| 3,541,336 | 11/1970 | Einstein.............................356/207 X |
| 3,561,845 | 2/1971 | Boronkay et al.......................356/205 |

Primary Examiner—Ronald L. Wibert
Assistant Examiner—Warren A. Sklar
Attorney—Martha L. Ross

[57] ABSTRACT

A system and process are disclosed for measuring the transmittance or opacity of a smoke plume discharged from a smokestack or diesel engine exhaust. Measurement is accomplished by passing light pulses through the smoke plume and detecting the remaining energy with a photoelectric detector. The effect of scattered light is eliminated. An electrical signal proportional to the unabsorbed light received at the detector is displayed on a calibrated opacity meter. The accuracy of the system and process is enhanced by negating or suppressing the effect of noise.

9 Claims, 1 Drawing Figure

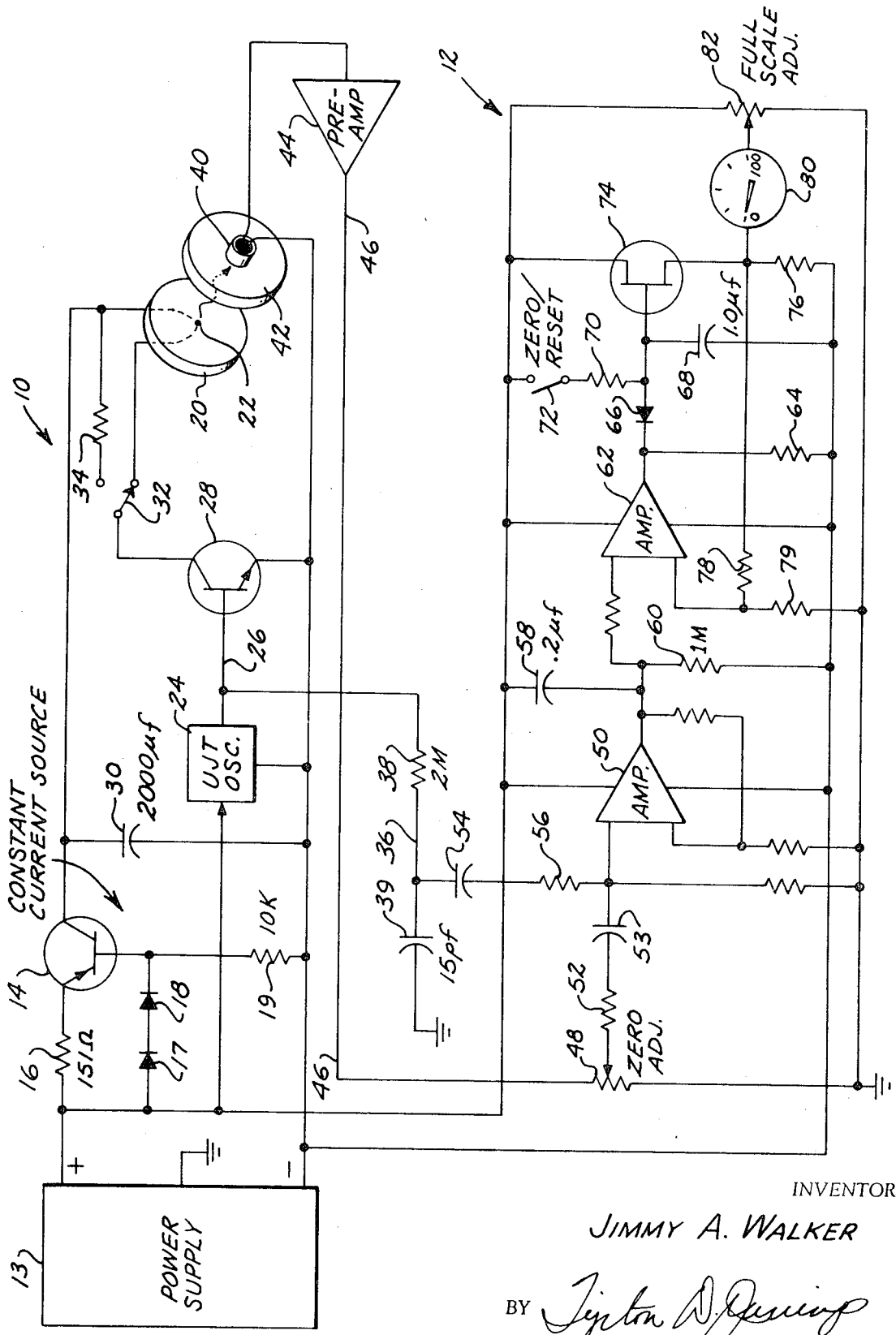

OPACITY METER WITH NOISE SUPPRESSION

BACKGROUND OF THE INVENTION

The present invention relates broadly to the field of densitometers or transmissometers and more particularly to a system and process for measuring the amount of light energy received through a medium being measured from a source of known or constant intensity. A particular use is in the measurement of the transmittance or opacity of smoke plumes.

Around the turn of the century a procedure for evaluating black smoke was devised by a French engineer, Maximilian Ringelmann, and is still widely used. The luminance of the smoke plume is compared to the luminance of four white charts on which are black grids obscuring 20, 40, 60 and 80 percent of the charts' surfaces.

A comparison is made between (1) the amount of light transmitted to the observer through the black smoke from the portion of sky on its far side and (2) the amount of light from a different and wider area of sky and from the sun, in whatever position it happens to be, reflected to the observer from the white areas of the chart. Even if the smoke does not scatter an appreciable amount of sun and sky light toward the observer, the limitations of such a comparison between totally different quantities has long been recognized. It is readily seen that there is some question as to the accuracy with which an observer can use such things as Ringelmann charts having various shades of blackness to determine the opacity of non-black plumes. Nevertheless, the Ringelmann charts remain the basis for smoke legislation and control in most, if not all, industrial nations. Other methods of comparison, such as those using filters as well as direct transmission measurement methods have been tried but have been found to be erroneous if the smoke is not black or if it scatters appreciable light to the observer or to the instrument.

As regards a smoke plume which is non-black or has some color, there appears to be no recognized method of truly evaluating it. In white smoke, for example, the plume is often brighter than light from the sky background because of the scattering of light the plume receives from the rest of the sky and from the sun. A study of the phenomenon of black and non-black plumes was recently completed by the U. S. Public Health Service in cooperation with the Edison Electric Institute. A report of these studies is presented in "Optical Properties and Visual Effects of Smokestack Plumes," No. 999–AP–30, published in 1967 by the U. S. Department of Health, Education and Welfare. Because of the growing interest in air pollution and because of the inadequacies of prior art techniques and instruments, there is a compelling need for an objective instrumental method and system for measuring plume emissions in the field.

In copending U.S. Pat. application Ser. No. 32,549, filed 28 Apr. 1970 by Edward Fox Kingman, and assigned to the assignee of the present application, there is disclosed a novel system and method for measuring the opacity of a medium even in the presence of scattered light and regardless of the color or lack of color of the medium. Using a smoke plume as an example, the difference in the luminance between a pair of contrasting targets viewed through the plume and viewed clear of the plume is measured. The targets consist of an optically flat black surface and a light source positioned in the center of the black target. The source is flashed at a constant rate, and a detector positioned opposite the target alternately sees the light source and the contrasting black target. A calibrated measuring circuit and meter process the energy received at the detector to provide an indication of the light attenuated or absorbed by the medium being measured. The calibration and construction of the system eliminates the effect of scattered light in the medium and provides a true measurement of transmittance. Thus, as in the particular instance of the opacity measurement of diesel exhaust, it now becomes a simple matter to ascertain whether or not the exhaust smoke falls within or without standards established by state or federal regulations.

SUMMARY OF THE INVENTION

This patent application improves upon the system and process for measuring the opacity of a medium, such as described in the aforementioned U.S. Pat. application Ser. No. 32,549, by negating the effect of noise and thereby making the opacity measurement more accurate.

It has been discovered in the use of the aforesaid system that noise can be generated by ambient conditions external of the system or by operating conditions within the system itself, by way of example, and cause erroneous measurements of opacity. The present invention negates or suppresses the effect of the unwanted noise components so that the total system noise has a reduced or minimal effect upon the accuracy of the opacity measurements.

BRIEF DESCRIPTION OF THE DRAWING

The foregoing and other objects, features and advantages of the invention will be apparent from the following more particular description of a preferred embodiment of the invention, as illustrated in the sole accompanying drawing showing the light transmitting and receiving circuits including the noise suppressing circuits forming the system of the present invention.

DESCRIPTION OF THE PREFERRED EMBODIMENT

The instrument shown in the drawing consists of two basic units, one being the transmitter 10, including a light source and contrasting target, and a receiver 12, comprising a detector and a processing and indicating circuit. The system can be used to measure the opacity of smoke plumes, by way of example; and one specific use to which the system components are readily adaptable is in the closed exhaust system of a diesel engine undergoing bench test. In such case the system is designed to be of a rugged construction and capable of withstanding intense heat, vibration and smoke for extended periods of time.

In the transmitter 10, a precision power supply 13 supplies power to a constant current source. This current source comprises a transistor 14, emitter resistor 16, diodes 17 and 18, and base resistor 19 connected in a conventional manner, as shown. This constant current source isolates the processing circuitry in the receiver 12 from the effect of light source pulsations generated in the transmitter 10, as later described. The output of the constant current source is connected to a light source 22 shown as centered in target 20. Light source 22 functions as a second target and is preferably a light-emitting diode having a substantially constant intensity of radiation. Target 20 is represented here as being circular in design and is sized to fill the view of the detector of receiver 12. The target 20 is preferably painted with an optically flat-black paint to provide a black or dark target reference.

Oscillator 24 is energized by power supply 13 and has its output applied by line 26 to the base of transistor switch 28. Oscillator 24 is designed to run at a frequency of 10,000 pulses per second (p.p.s.) and thus operates switch 28 at this same rate. When conducting, transistor switch 28 completes the current path through light-emitting diode 22 and therefore drives this light source at the aforementioned 10,000 p.p.s. rate. The combination of this pulsing light source and a target 20 provides alternate contrasting targets to the field of view of the detector.

A capacitor 30 is connected across the output of the constant current source and is charged thereby between the light pulses emitted by diode 22. As can be seen from the drawing, a discharge path for capacitor 30 is provided through diode 22 each time transistor switch 28 conducts. Capacitor 30 is preferably of a large value, capable of storing a charge sufficient to accommodate the firing current demands of diode 22.

Switch 32, connected to the collector of transistor 28, is normally in the position shown but is moved to the opposite contact when making a full-scale calibration of the system. In the latter position, light source 22 is bypassed and a smallvalued resistor 34 is inserted in the current path through switch 28.

Connected to line 26 in the transmitter 10 is another line 36 which terminates at the detector 12. This line 36 includes a large-valued, current-limiting resistor 38 connected in series with capacitor 39. The junction of these last two components is connected into the first amplifying stage of detector 12. Each time oscillator 24 fires, resistor 38 and capacitor 39 shape the leading edge of the positive-going pulse to provide a small voltage spike into the detector 12 in coincidence with the received signal, for the reason more fully explained hereinafter.

In the receiver 12, the detector 40 is aimed at the light-emitting diode 22 so that this diode and the target 20 fill its view, and to this end is represented as being mounted in a recessed fashion in plate 42. Detector 40 is preferably a photo-sensitive diode, such as a silicon photo diode, whose current is precisely controlled by the intensity of received light. Detector 40 and the targets 20 and 22 are spaced apart to permit the passage of a smoke plume therebetween.

This depiction of the targets 20 and 22 and detector 40 in the drawing is but an example of the structure which can be employed in practice so long as the detector 40 is presented with alternate, contrasting targets during operation. As an example of an alternative structure, lens can be incorporated at both the light source 22 and detector 40 to provide a pulsed, collimated light beam which intersects the smoke plume path and is focused onto the detector. The use of lens permits the source 22 and detector 40 to be recessed within aligned, tubular housings of narrow diameter. When the light source is dark between pulses, the absence of light within the tubular housings functions as the equivalent of dark target 20.

The anode of diode 40 is connected to negative supply and its cathode is connected to the input of pre-amplifier 44. Pre-amplifier 44 amplifies the current pulses out of diode 40 and thus enhances the signal-to-noise ratio of the signals applied to the processing circuit by line 46. Line 46 terminates at input resistor 48 constructed as a potentiometer. This potentiometer controls the input level to the amplifying circuits and provides a means for making a zero calibration of the meter circuit, as later described. The tap of potentiometer 48 is connected to the non-inverting input of amplifier 50 through resistor 52 and capacitor 53, the latter serving to block the passage of steady-state components.

Amplifier 50 is an operational amplifier and provides a high, stable gain to input signals. Also connected into the input of amplifier 50 via dc blocking capacitor 54 and resistor 56 is the signal applied from oscillator 24 via line 36, said signal being shaped by resistor 38 and capacitor 39, as described previously. The remaining inputs to the amplifier 50 are conventional input and bias circuits and feed-back loops for such purposes as fast recovery and gain control. Amplifier 50 has no internal or external load resistor and instead has its output connected to the lower side of storage capacitor 58. The opposite side is connected to the positive supply. Resistor 60 of high resistance, preferably on the order of 1 megohm, provides a leakage or bleed path for capacitor 58 to the negative supply. The voltage level at capacitor 58 is applied to the non-inverting input of another operational amplifier 62 which is designed to provide essentially tenfold gain and a high input impedance to the input voltage provided by capacitor 58.

The output of amplifier 62 is connected to load resistor 64 and to the cathode of diode 66. Capacitor 68 is connected from the anode of diode 66 to negative supply. Also connected to this anode is resistor 70 and a normally opened switch 72 used for zero calibration and to reset the circuit, as later described.

The voltage level at capacitor 68 is applied to the gate of a field-effect transistor 74. This transistor has a resistor 76 connected between its source electrode and negative battery. Transistor 74 functions as a source follower; thus, the voltage on capacitor 68 is followed by resistor 76. A feed-back circuit including resistors 78 and 79 is applied from this source resistor 76 to the inverting input of operational amplifier 62 to overcome voltage offset of the FET and non-linearity of the diode 66, and also to provide a high input impedance at the non-inverting input.

Meter 80 is connected in a bridge circuit including transistor 74 and resistor 76 on one side of the bridge and potentiometer 82 on the opposite side of the bridge.

The operation of the system can be best understood from a preliminary discussion of the practical measurement of opacity. The basis for an opacity meter can be established even in the presence of scattered light by measuring and comparing the luminance difference between a pair of contrasting targets viewed clear of the plume and through the plume. The value of opacity is one minus the value of transmittance, the latter being a property of transmitted light that can be used to differentiate and characterize plumes. With regard to the luminance of targets, transmittance is defined as:

$$T = B_1' - B_2'/B_1 - B_2, \quad (1)$$

where $B_1$ is the luminance of a source, $B_2$ is the luminance of its background, both $B_1$ and $B_2$ viewed clear of the plume; $B_1'$ is the apparent luminance of a source, $B_2'$ is the apparent luminance of its background, both viewed through a plume. In this transmittance formula, both $B_1'$ and $B_2'$ have the same added increment of light caused by scattering, and the scattered light cancels out.

The present system is designed to be calibrated to make the contrast or difference in the luminance clear of the plume, i.e., $B_1 - B_2$, equal to 100. The contrast between the apparent luminances, as viewed through the smoke plume, is then:

$$B_1' - B_2'/100. \quad (2)$$

Now, if both terms of apparent luminance can be referenced to zero by subtracting term $B_2'$, it drops out of the equation leaving only a corrected value of transmittance of $$B_1'/100 \quad (3)$$

for the medium being measured.

In the actual design of the system, the meter face has been designed to read opacity directly, from zero to 100%, instead of transmittance. If desired, the latter can be also read off of the meter, or the meter face provided with another scale because zero opacity equals 100% transmittance and 100% opacity equals zero transmittance. Capacitor 53, previously discussed, blocks all steady-state input signals and thus references the contrast between apparent luminances to zero. The effect of scattering is eliminated.

Prior to the measurement of opacity of a smoke plume, the system is calibrated to make the contrast clear of the plume equal to 100. Assume for the purpose of obtaining a better understanding of the calibration procedure initially that line 36 is missing so that no voltage spikes are applied from oscillator 24 to amplifier 50. 100% opacity is calibrated first. The contact of switch 32 is moved to its upper position which disconnects light-emitting diode 22 and connects resistor 34 in circuit. Thus, when oscillator 24 fires, no current flows through diode 22 and no light is emitted. With no light pulses arriving at diode 40 in the receiver, at best only a steady-state signal will appear across potentiometer 48. However, capacitor 53 blocks any such signal; and a zero voltage is applied at the input to amplifier 50. The lower plate of capacitor 58 is held at about zero volts by amplifier 50, and the output of amplifier 62 is held at this same voltage. Capacitor 68 is discharged. With no voltage applied to resistor 76 from the detecting and amplifying circuitry, potentiometer 82 is adjusted to give a full scale reading of 100% opacity.

For zero calibration, switch 32 is placed at its normal position, as shown. Oscillator 24 begins to function and operates transistor switch 28 at the 10,000 p.p.s. rate. Switch 72 is now closed, and capacitor 68 begins to charge. Light pulses emitted at 10,000 p.p.s. by diode 22 are detected at diode 40 in the receiver, creating current pulses which are amplified by pre-amplifier 44. A proportional voltage is applied across potentiometer 48 and tapped into amplifier 50. Amplifier 50 begins to raise the lower plate of capacitor 58 up to the level of its upper plate. The voltage level attained at this lower plate will be proportional to the voltage at the tap of potentiometer 48. Amplifier 62 applies tenfold gain to this positive voltage at capacitor 58, and this positive voltage appears at its output. Diode 66 now limits the level to which capacitor 68 can charge, i.e., the level on capacitor 68 cannot exceed the level on capacitor 58, or else diode 66 will conduct to bring the charge on capacitor 68 down to the level of capacitor 58. The voltage level attained by capacitor 68 appears at resistor 76, and the meter 80 will be at or close to a zero percent reading. If any adjustment of the meter is needed to give an exact zero reading, the tap of potentiometer 48 can be moved. The effect is to change the voltage at the lower plate of capacitor 58 and, accordingly, at capacitor 68 and across resistor 76. It can be seen from the above description that the degree of contrast between the signal and no-signal conditions, or light and dark targets, is not critical because of the system's ability to calibrate for 100% and 0% readings.

With the system now calibrated for target contrast clear of any exhaust plume, the light-emitting diode 22 and detector 40 are positioned so that the exhaust plume from a diesel engine will span or pass through the line-of-sight between these two members. The system is first reset by closing switch 72, and a full charge is applied to capacitor 68. If the smoke being tested is transparent and free of light-attenuating or -absorbing particles, then the circuit will function much the same as was described in the zero calibration mode so that sufficient charge remains on capacitor 68 to cause a 0% opacity reading at meter 80. Assume, however, the usual case where the smoke is black, non-black or colored. The light pulses out of diode 22 will be attenuated or absorbed by the smoke causing a reduction in the intensity of the pulses received by diode detector 40. Because the current through this latter diode is controlled by the intensity of the received light, the amplitude of these pulses will be less than realized for a zero reading. These pulses are amplified in preamplifier 44, the output being applied on line 46 and across potentiometer 48. Amplifier 50 amplifies these pulses and applies their peak positive level to the lower plate of storage capacitor 58 to raise its level towards that of the upper plate. Thus, the voltage stored on the lower plate of capacitor 58 is proportional to the voltage tapped at potentiometer 48.

With the pulses being applied at a 10,000 p.p.s. rate, the charge on capacitor 58 accumulates quickly to the full value of these amplitude peaks. This level appears at the output of amplifier 62. The cathode of diode 66 will now be at a lower potential than its anode causing this diode to become forward-biased. Capacitor 68 discharges through diode 66 until the voltage level at this capacitor is in balance with the output of the amplifier. At such time, diode 66 becomes reverse-biased and cuts off.

The voltage on capacitor 68 appears at resistor 76 in the meter circuit and unbalances the bridge circuit of the meter 80 causing current flow. The needle of meter 80 will now move away from the 0% point and come to rest at a reading of opacity indicative of the opacity of the smoke being tested.

The purpose of applying a small spike or pedestal pulse to amplifier 50 will now be explained. It is contemplated that portions of the system shown in the drawing will be used in an environment where electromagnetic interference or other sources can cause random noise signals to be picked up and processed by the system. For example, the diodes 22 and 40 may be positioned at a test location while the remainder of the system remotely placed at a monitoring or control point. In such case, the supply lines to the diodes and the signal line 46 will, of necessity, be exposed to the noise sources. It has been found that noise signals being electrical in nature can create erroneous readings at meter 80 because these undesired electrical signals will be processed the same as true signals. Thus, for example, at 100% opacity when no signal is received at diode detector 40, a noise signal can be of a sufficient level to prevent the lower plate of capacitor 58 from discharging to zero potential. The result is that meter 80 will read less than 100% opacity. At the lower levels of opacity (larger input signals), the noise signals will have a much-reduced effect because the true signals will keep the voltage at the lower plate of capacitor 58 at the desired higher level.

The use of line 36 and the shaping circuitry of resistor 38 and capacitor 39 provides a small, e.g. 3 m.v., spike or pedestal pulse to the input of amplifier 50. Each pedestal pulse arrives in synchronism with each signal pulse out of the detector preamplifier 44, and these two pulse signals are summed at the input of amplifier 50. Amplifier 50 now amplifies these summed signals and applies them to the lower plate of storage capacitor 58. Thus, the voltage stored is proportional to the voltage tapped at potentiometer 48 summed with the small pedestal pulse applied by line 36. Thereafter, even at 100% opacity caused by the absence of any light reaching detector 40, a small voltage level caused by the pedestal pulse will be present at the lower plate of capacitor 58. This small level is designed to be greater than the voltage level created by noise and thus will control the reading of meter 80 to the exclusion of noise signals.

During the calibration of the system as described above, the effect of the pedestal pulses on amplifier 50 was ignored. During actual calibration, however, potentiometers 48 and 82 are adjusted, respectively, during the 0% and 100% opacity calibrations, so that the effect of the pedestal pulse does not give an erroneous reading at the meter. In other words, the pedestal pulse signal is effectively canceled at the meter by adjusting these two potentiometers.

The use of a constant current source in transmitter 10 eliminates a source of noise caused by the operation of light-emitting diode 22. This constant-current source creates a fixed current demand upon power supply 13 regardless of the load current demands of diode 22. In operation, this source charges capacitor 30 between the pulses generated by oscillator 24. When oscillator 24 fires and switches on transistor 28, capacitor 30 supplies the large current flow demands of diode 22. However, the charge/discharge cycle of this capacitor is not seen back at the power supply 13 which continues to supply a small fixed charging current into the constant current source.

In contrast, were a resistor used in place of the constant current source, each firing of diode 22 would be tracked across the resistor resulting in noise on the supply lines as capacitor 30 goes through its high frequency charge/-discharge cycles. In contrast, the constant-current source isolates this effect of the operation of the light-emitting diode 22 from the supply lines and thus little or no noise from this cause will be seen by the sensitive processing circuitry in receiver 12 during the taking of opacity measurements.

The RC circuit combination of capacitor 58 and resistor 60 provides a time constant which permits only a very slight discharge of capacitor 58 between the input pulses. Nevertheless, if opacity should increase while the measurement is being taken, capacitor 58 will discharge quickly down to this new level, thereby causing further discharge of capacitor 68 through diode 66 to give a higher opacity reading which is held at meter 80. If, on the other hand, opacity should decrease during the reading, or if there is any doubt as to whether a completed reading is an accurate one, it is a simple matter to close switch 72 to recharge capacitor 68 fully and thereby reset the meter to a 0% reading in preparation for a new measurement.

In practice, the degree of contrast between light source 22 and its target is not critical. In fact, the target may become appreciably dirty or worn, or smoke particles may coat the surfaces of diodes 22 and 40 reducing contrast or causing a reduction in light intensity without affecting system operation, so long as the system can be calibrated for zero and full scale meter deflections. Also, since the measurement of opacity does depend on difference readings, the need for critical or precision components is obviated, except perhaps for diodes 22 and 40, since all readings will be affected in the same manner.

While the invention has been particularly shown and described with reference to a preferred embodiment thereof, it will be understood by those skilled in the art that various changes in form and details may be made therein without departing from the spirit or the scope of the invention.

What is claimed is:

1. A system for measuring the opacity or transmittance of a medium comprising:
   a. a light transmitter, for transmitting light through a zone in which said medium may be located,
   b. means for pulsing said light transmitter to cause the pulsed emission of light therefrom,
   c. a light detector spaced from said light transmitter to detect the pulses of light emitted by said light transmitter and transmitted through said zone,
   d. means for processing the pulsed output of said detector to produce an electrical signal proportional to the light detector output,
   e. means responsive to the output of said processing means for indicating the opacity or transmittance of the medium being measured, and
   f. means for suppressing the effect of noise signals upon the accuracy of system measurements including:
      1. means for producing pulsed electrical signals and for applying said pulsed electrical signals to said means for processing in synchronism with the light detector output pulses effectively to elevate the light detector output pulses with reference to the level of the noise signals.

2. A system as claimed in claim 1 wherein said means for producing pulsed electrical signals includes a pulse-shaping circuit so that each pulsed electrical signal applied to said means for processing is a pedestal pulse, one pedestal pulse being applied in synchronism with each light detector output pulse.

3. A system as claimed in claim 2 wherein said processing means includes an amplifier and wherein said means for producing pulsed electrical signals is responsive to the output of said means for pulsing so that a pedestal pulse is produced for application to amplifier each time said means for pulsing actuates said light transmitter, thereby to establish the synchronism between the two types of pulses applied to said amplifier.

4. A system as claimed in claim 3 further comprising means for calibrating said processing means to prevent the pedestal pulse being applied to the amplifier from causing erroneous indications of opacity or transmittance.

5. A system as claimed in claim 3 further comprising:
   a. a power supply, and wherein said means for suppressing noise further includes:
   b. a constant current source connected between said power supply and said light transmitter,
   c. said constant current source serving to isolate the power supply and thereby the remainder of the system from the effect of noise created by the rapid pulsing of said light transmitter.

6. A system as claimed in claim 4 further comprising:
   a. a contrasting target for said light transmitter,
   b. said means for calibrating serving to calibrate said means for processing with reference to said light transmitter and contrasting target in the absence of the effect of said medium, and
   c. means for eliminating the effect of scattered light caused by said medium and received at said light detector.

7. A system as claimed in claim 6 wherein:
   a. said medium is a smoke plume, and
   b. said means for indicating is a meter for producing a direct reading in percent opacity of said smoke plume.

8. A system as claimed in claim 7 wherein:
   a. said light transmitter is a light-emitting diode,
   b. said light detector is a photo diode detector, and
   c. said means for pulsing includes an oscillator for generating pulses at a substantially stable rate.

9. A system as claimed in claim 5 further comprising:
   a. a contrasting target for said light transmitter,
   b. means for calibrating said means for processing with reference to said light transmitter and contrasting target in the absence of the effect of said medium, and
   c. means for eliminating the effect of scattered light caused by said medium and received at said light detector.

* * * * *